United States Patent
Furlani et al.

[11] Patent Number: 5,981,087
[45] Date of Patent: Nov. 9, 1999

[54] WEAR RESISTANT TRANSPORT WEB

[75] Inventors: Edward P. Furlani, Lancaster; Dilip K. Chatterjee; Syamal K. Ghosh, both of Rochester, all of N.Y.

[73] Assignee: Eastman Kodak Company, Rochester, N.Y.

[ * ] Notice: This patent is subject to a terminal disclaimer.

[21] Appl. No.: 08/901,187

[22] Filed: Jul. 28, 1997

[51] Int. Cl.⁶ .............................. B32B 15/04; B65G 15/48
[52] U.S. Cl. .......................... 428/626; 428/632; 428/633; 198/957
[58] Field of Search .................................. 428/626, 632, 428/633, 680, 935, 936, 675, 673, 667, 672; 198/957

[56] References Cited

U.S. PATENT DOCUMENTS

| | | | |
|---|---|---|---|
| 3,908,916 | 9/1975 | Brain | 198/41 |
| 4,073,699 | 2/1978 | Hutkin | 204/13 |
| 4,929,512 | 5/1990 | Nishimura et al. | 428/610 |
| 5,002,178 | 3/1991 | Yamada | 198/847 |
| 5,254,045 | 10/1993 | Takahashi et al. | 474/92 |
| 5,579,898 | 12/1996 | Nakagawa et al. | 198/851 |
| 5,614,340 | 3/1997 | Bugner et al. | 430/41 |
| 5,848,684 | 12/1998 | Furlani et al. | 198/805 |
| 5,861,692 | 1/1999 | Furlani et al. | 310/103 |
| 5,865,298 | 2/1999 | Furlani et al. | 198/805 |

FOREIGN PATENT DOCUMENTS 2 289 249   5/1994   United Kingdom .

*Primary Examiner*—John J. Zimmerman
*Attorney, Agent, or Firm*—Clyde E. Bailey, Sr.

[57] ABSTRACT

A wear resistant transport web (12) having a flexible base layer (76), and a first bonding layer (84) at least partially surrounding and bonded to the base layer (76). The wear resistant transport web (12) further comprises a first layer (86) comprising a corrosion resistant material, wherein said corrosion resistant material is electroplated nickel or electroless nickel, at least partially surrounds and is bonded to the first bonding layer (84) of the transport web (12). In addition, the wear resistant transport web (120 has a second bonding layer (88) is provided that at least partially surrounds and is bonded to the first layer (86). A second layer (90), comprising a wear and abrasion resistant material, wherein said wear and abrasion resistant materials is selected from the group consisting of: polyurethane; acrylic; silicon dioxide; alumina; chromium oxide; zirconium oxide; composites of zirconia-alumina; or a mixture thereof. The second layer (90) at least partially surrounds and is bonded to the second bonding layer.

2 Claims, 2 Drawing Sheets

5,981,087

WEAR RESISTANT TRANSPORT WEB

FIELD OF THE INVENTION

The invention relates to the transportation of materials, more particularly, the invention concerns a wear resistant transport web for transporting materials in corrosive environments.

BACKGROUND OF THE INVENTION

Material transport systems utilizing transport webs are used extensively in manufacturing processes to transport components from one station to the next. In numerous manufacturing processes, the transport system is exposed to abrasive or corrosive environments. For example, in electroplating, painting and encapsulation of components, pretreatment processes such as cleaning and surface etching entail the exposure of the transport system and transported components to abrasive particles and corrosive chemicals. Conventional transport webs degrade when exposed to corrosive or abrasive environments. The degradation of the transport web can cause undesired damage to other members of the transport system as well as to the transported components. Thus, conventional transport systems that utilize conventional transport webs in corrosive or abrasive environments require costly and time consuming maintenance for web repair and replacement. Therefore, a need exists for a transport web that can operate without degradation in corrosive or abrasive environments. The subject of this disclosure is a wear, abrasion and corrosion resistant transport web for use in abrasive and corrosive manufacturing environments.

SUMMARY OF THE INVENTION

It is, therefore, one object of the invention to provide a transport web that is capable of transporting a materials and components in a corrosive environment.

It is another object of the invention to provide a transport web that is wear and abrasion resistant.

It is a feature of the invention that a transport web, in rotating contact with transport rollers has multiple layers including a corrosion resistant layer and a wear and abrasion resistant layer surrounding a base layer.

To solve one or more of the problems above, there is provided, in one aspect of the invention, a wear resistant transport web having a flexible base layer, and a first bonding layer at least partially surrounding and bonded to the base layer. Further, a first layer comprising a corrosion resistant material, wherein said corrosion resistant material is electroplated nickel or electroless nickel, at least partially surrounds and is bonded to the first bonding layer of the transport web. A second bonding layer is provided that at least partially surrounds and is bonded to the first layer. The second layer, comprises a wear and abrasion resistant material, wherein said wear and abrasion resistant materials is selected from the group consisting of: polyurethane; acrylic; silicon dioxide; alumina; chromium oxide; zirconium oxide; composites of zirconia-alumina; or a mixture thereof. The second layer at least partially surrounds and is bonded to the second bonding layer.

It is therefore an advantageous effect of the present invention that materials can transported in a corrosive environment without degradation of the transport web.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 2b is a cross-sectional view of the web taken along line 11b—11b of FIG. 2a.

DETAILED DESCRIPTION OF THE INVENTION

Figure 1:
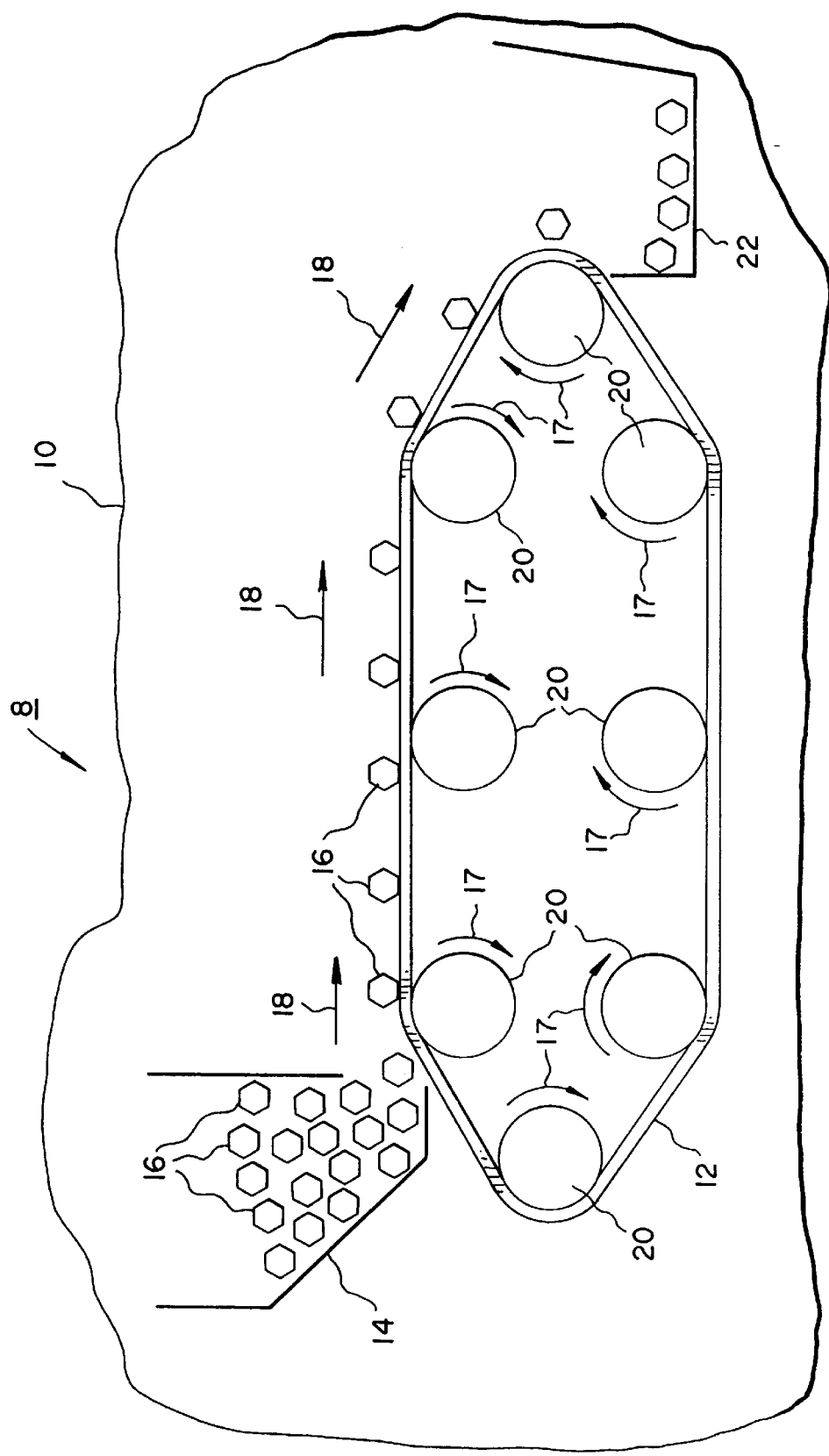
FIG. 1 is a schematic of a material transport system.

Referring to FIG. 1, a schematic cross-sectional view is shown of a material transport system 8 comprising a frame 10, transport web 12, a portion of which is in proximity to a reservoir 14 of components 16, and a plurality of transport rollers 20 which are mounted to said frame 10 for rotation about their longitudinal axis, and are driven by motors (not shown). The motors (not shown) rotate the transport rollers 20 as indicated by rotation arrows 17, and the web 12 is translated by the transport rollers 20 as indicated by arrows 18 due to the force of friction between the transport web 12 and the transport rollers 20. The reservoir 14 is oriented in such a way that the force of gravity causes components 16 to fall onto the transport web 12 as it moves. Once on the transport web 12, the components 16 are carried along on the transport web 12 ultimately falling off the transport web 12 into a container 22.

Figure 2A:
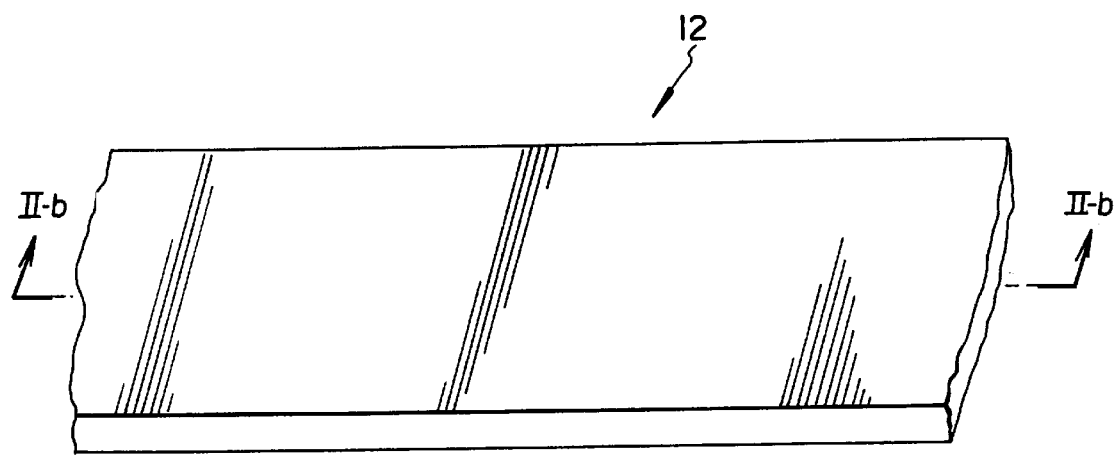
FIG. 2a is a perspective view of the web of the present invention.
Figure 2B:
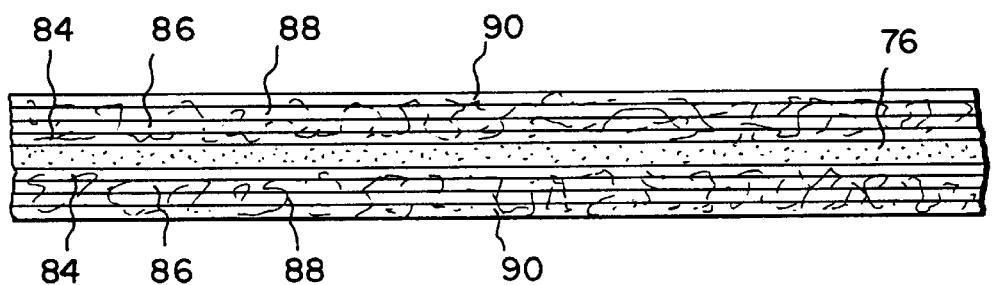

Referring to FIGS. 2a and 2b, web 12 according to the principles of the invention is illustrated. The web 12 comprises preferably a flexible base layer 76. In addition to the base layer 76, web 12 comprises first and second layers 86 and 90 surrounding the base layer 76. Layers 86 and 90 are preferably coated onto the base layer 76 using the techniques described below. According to our preferred embodiment, a first bonding layer 84 is coated onto the base layer 76. First bonding layer 84 is preferably comprised of copper or copper based alloys, chromium, gold, silver and combinations thereof. Most preferred is copper and its alloys. Skilled artisans will appreciate that first bonding layer 84 may be applied to base layer 76 by using any of several conventional techniques. We, however, prefer depositing the first bonding layer 84 onto base layer 76 using physical vapor deposition (PVD), chemical vapor deposition (CVD), or some electroless or electrolytic deposition process, each producing substantially the same result. Preferably, first bonding layer 84 is deposited onto base layer 76 using an electrolytic deposition process. In the preferred embodiment, first bonding layer 84 has a thickness in the range of about 50 to 200 Angstroms, preferably 100 Angstroms.

Referring once again to FIG. 2b, after the first bonding layer 84 is bonded to base layer 76, a first layer 86 comprising a corrosion resistant material, is coated onto the first bonding layer 84. First layer 86 comprises preferably a coating of electroplated nickel or electroless nickel. The preferred method for depositing the first layer 86 of corrosion resistant material onto first bonding layer 84 is electroless plating. The first bonding layer 84 functions to enhance the adhesion of the first layer 86 of corrosion resistant material to the base layer 76. Preferably, first layer 86 has a thickness between 0.1 mil to 1 mil, most preferred being 0.5 mil.

According to FIG. 2b, a second bonding layer 88 is coated onto first layer 86. Second bonding layer 88 comprises alloys of nickel-aluminum, nickel-chromium, cobalt-chromium-aluminum or combinations thereof. While numerous techniques may be used to deposit the second bonding layer 88, we prefer using PVD or plasma spraying. Preferably, second bonding layer 88 has a thickness in the range of about 1,000 to 10,000 Angstroms, most preferred being 5,000 Angstroms.

Still referring to FIG. 2*b*, a second layer 90 comprising a wear and abrasion resistant material, is coated onto the second bonding layer 88. The second bonding layer 88 enhances the adhesion and minimizes the porosity of the second layer 90 by sealing pores (not shown) in the second layer 90. The preferred method for coating the second layer 90 onto the second bonding layer 88 is by dipping the web 12 in solutions of polyurethane or acrylic. Alternatively, the second layer 90 may be spin or dip coated onto the second bonding layer 88 of web 12 in a solution of sol-gel comprising silicon dioxide or alumina. Yet another acceptable technique for coating the second layer 90 onto the second bonding layer 88 is thermal or plasma spraying with a wear and abrasion resistant material such as chromium oxide, zirconium oxide, or composites of zirconia-alumina.

While the invention has been described with a certain degree of particularity, it is manifest that many changes may be made in the details of the construction and the arrangement of the components without departing from the spirit and scope of the disclosure. It is understood that the invention is not limited to the embodiments set forth herein for purposes of exemplification, but is to be limited only by the scope of the attached claims, including the full range of equivalency to which each element thereof is entitled.

PARTS LIST

8 . . . transport system
10 . . . frame
12 . . . transport web
14 . . . reservoir
16 . . . components
17 . . . rotation arrows
18 . . . arrows
20 . . . roller
22 . . . container
76 . . . base layer
84 . . . first bonding layer
86 . . . first layer
88 . . . second bonding layer
90 . . . second layer

What is claimed is:

1. A wear resistant transport web, comprising:

a base layer;

a first bonding layer at least partially surrounding and bonded to said base layer, said first bonding layer being selected from the group consisting of: (a) copper; (b) copper based alloys; (c) chromium; (d) gold; (e) silver; and (f) a mixture thereof, a first layer of corrosion resistant material at least partially surrounding and bonded to said first bonding layer, wherein said corrosion resistant material is electroplated nickel or electroless nickel;

a second bonding layer at least partially surrounding and bonded to said first layer; and, a second layer of wear and abrasion resistant material at least partially surrounding and bonded to said second bonding layer, wherein said wear and abrasion resistant material is selected from the group consisting of: (a) polyurethane; (b) acrylic; (c)silicon dioxide; (d) alumina; (e) chromium oxide; (f) zirconium oxide; (g) composites of zirconia-alumina; or a mixture thereof.

2. The wear resistant transport web recited in claim 1, wherein said second bonding layer is selected from the group consisting of: (a) alloys of nickel-aluminum; (b) alloys of nickel-chromium; (c) alloys of cobalt-chromium-aluminum; or a mixture thereof.

* * * * *